(No Model.)

G. W. LEWIS.
MOTOR VEHICLE.

Patented May 17, 1898.

Witnesses.
Inventor
George W. Lewis
By Dayton, Poole & Brown, Attys (No Model.) 5 Sheets—Sheet 3.

G. W. LEWIS.
MOTOR VEHICLE.

No. 604,237. Patented May 17, 1898.

Witnesses.
Wm M. Rheem.
Jno. W. Adams.

Inventor.
George W. Lewis
By Dayton, Poole & Brown
Att'ys (No Model.)

G. W. LEWIS.
MOTOR VEHICLE.

No. 604,237. Patented May 17, 1898.

Witnesses.
Wm. M. Rhem.
Jno. W. Adams.

Inventor.
George W. Lewis
By Dayton, Poole & Brown
Atty's.

(No Model.) 5 Sheets—Sheet 5.

G. W. LEWIS.
MOTOR VEHICLE.

No. 604,237. Patented May 17, 1898.

Witnesses.
Wm. M. Rheem.
Jno. W. Adams.

Inventor
George W. Lewis
by Dayton, Poole & Brown
Atty's

UNITED STATES PATENT OFFICE.

GEORGE W. LEWIS, OF CHICAGO, ILLINOIS.

MOTOR-VEHICLE.

SPECIFICATION forming part of Letters Patent No. 604,237, dated May 17, 1898.

Application filed June 14, 1894. Renewed October 25, 1897. Serial No. 656,318. (No model.)

*To all whom it may concern:*

Be it known that I, GEORGE W. LEWIS, of Chicago, in the county of Cook and State of Illinois, have invented certain new and useful Improvements in Motor-Vehicles; and I do hereby declare that the following is a full, clear, and exact description thereof, reference being had to the accompanying drawings, and to the letters of reference marked thereon, which form a part of this specification.

This invention relates to improvements in motor-vehicles, and more especially to the driving connections between the engines or prime movers of such vehicles and the driving-wheels thereof, by which power is transmitted from the former to the latter.

The invention is more particularly intended for use in connection with gas or vapor engines, but the principal features thereof may be employed in connection with other motors.

The invention consists in the matters hereinafter described, and pointed out in the appended claims.

As shown in the accompanying drawings, Fig. 2 is a plan view of the same.

Figure 3:
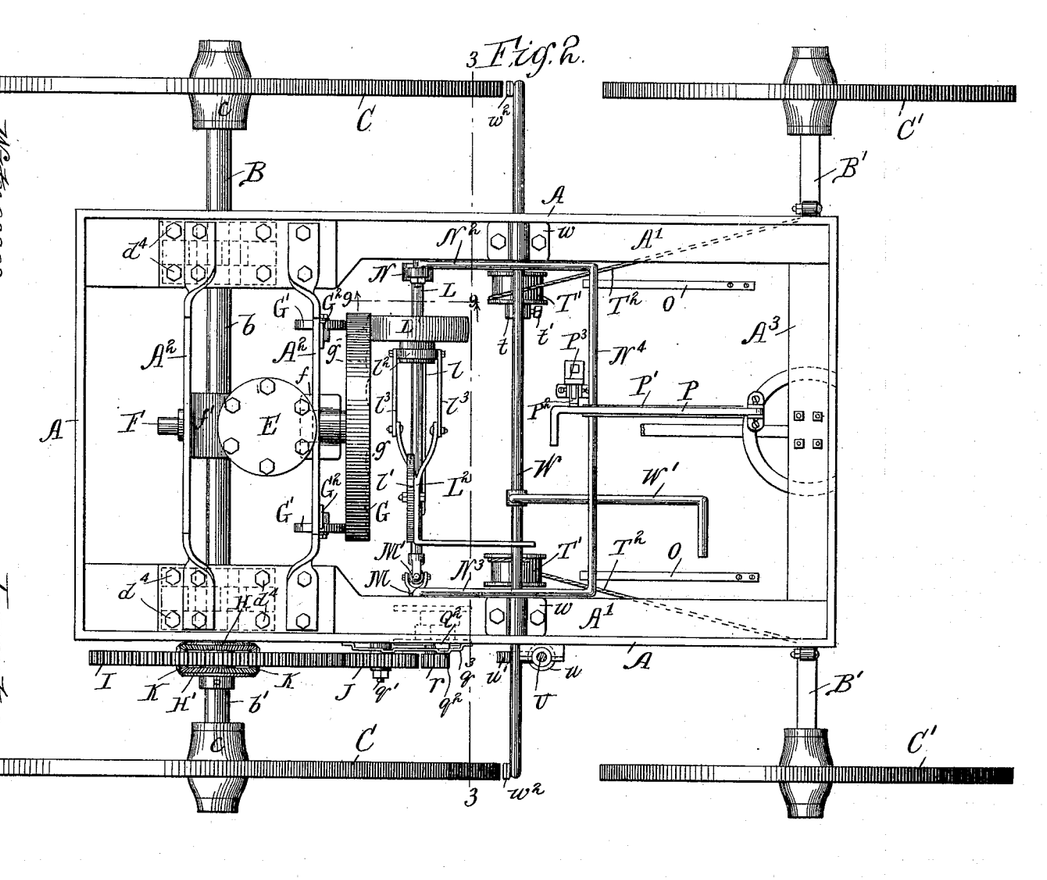
Fig. 3 is a section taken on line 3 3 of Fig. 2.
Figures 3, 12:
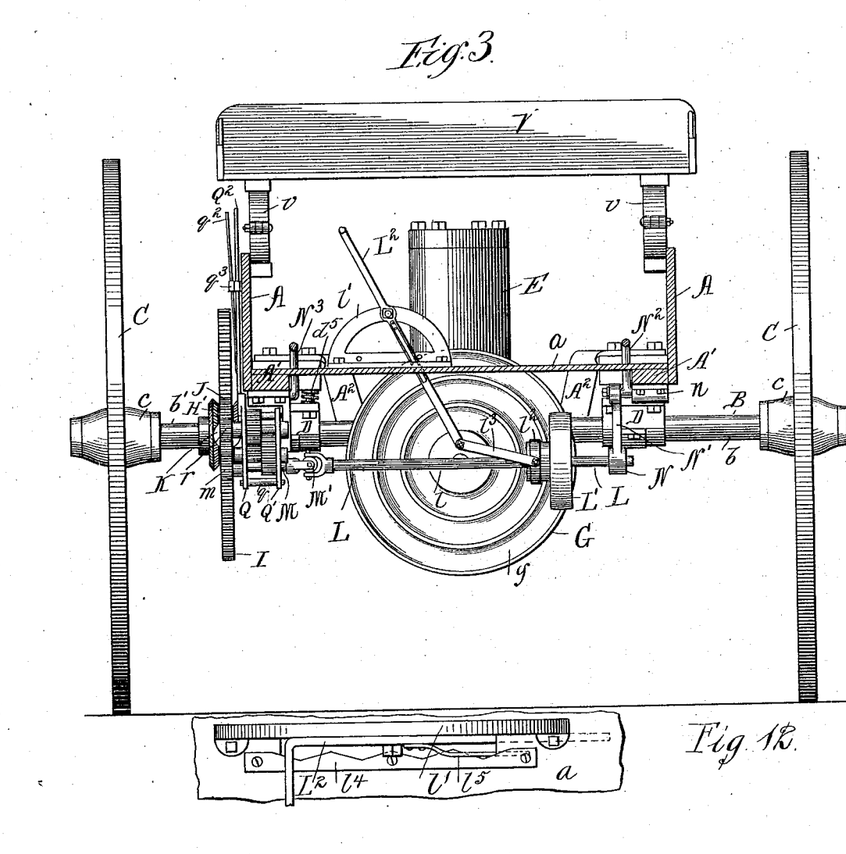
Figure 4:
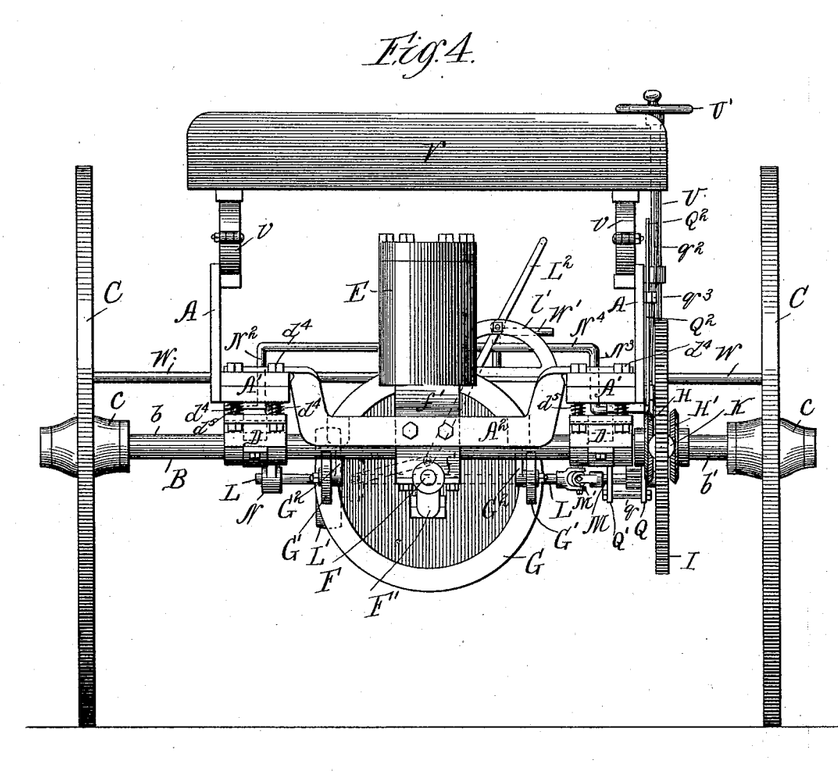
Fig. 4 is a view in rear elevation of the same.

As shown in said drawings, A indicates the body of the vehicle, in this instance shown as having the form of the box or body of a light road-wagon. Said body A is shown as being provided with longitudinal frame-pieces A' A', which are connected by two parallel cross-pieces $A^2$ $A^2$ at the rear and by a cross-piece $A^3$ at the front of the body, so as to form a rectangular frame to which the several operative parts of the motor are attached or on which they are mounted. For clearness of illustration the bottom or floor of the vehicle-body is omitted, excepting in Figs. 3, 10, and 11, wherein $a$ indicates such bottom or floor.

B B' indicate the rear and front axles, respectively, of the vehicle, and C C C' C' rear and front supporting-wheels applied to said axles.

Figure 5:
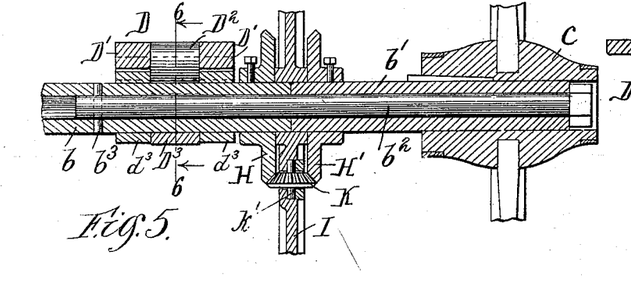
Fig. 5 is a detail longitudinal section of the rear of the driving-axle, showing connections of the same with the driving devices and also the axle-bearing.

The rear axle B is compound in its structure, consisting of two separate tubes or sleeves $b$ $b'$ and an interior shaft or spindle $b^2$, which latter is secured rigidly in the tubular part $b$ of the axle and extends through and affords bearing for the tubular part $b'$ thereof, as clearly seen in Fig. 5. The shaft $b^2$ is shown as secured to the tubular part $b$ by means of a cross-pin $b^3$; but these parts may be otherwise rigidly connected. The hubs $c$ $c$ of the rear wheels C C are rigidly attached to the outer ends of the parts $b$ $b'$ of the wheel-axle, so as to turn with the same, the axle being adapted to rotate, and for this purpose being mounted in bearings D D, which are secured to the body of the vehicle, preferably by attachment to the side frame-pieces A' A'. Said bearings are shown as having the form of antifriction-roller bearings and as being secured to the frame of the vehicle-body by spring connections, as will be hereinafter more particularly described.

The front axle B' is made of the usual form and connected with the vehicle-body by a central pivot or king bolt. Said axle is suitably connected with steering gear or mechanism on the wagon-body, by which the axle and front wheels may be swung or turned for guiding the vehicle, as will be hereinafter more fully described.

E indicates the cylinder of a gas or vapor engine or other prime mover having a reciprocating piston, the cylinder herein shown being that of an explosive gas or vapor engine, which latter form of motor is preferred by reason of its lightness and the ease and convenience with which it may be operated and controlled. The cylinder E is located centrally of the vehicle-frame at a point nearly above the rear axle and is supported by attachment to the cross-pieces $A^2 A^2$ of the frame.

F indicates the crank-shaft of the motor, the same being located below the cylinder and the rear axle B and arranged longitudinally of the machine or at right angles to said rear axle. The said crank-shaft has bearings at its front and rear ends in hangers $f f'$, which depend from the cross-pieces $A^2 A^2$ of the frame. A connecting-rod $e$ serves to transmit motion from the piston within the cylinder E to the crank $F'$ of the crank-shaft in the usual manner. At its forward end the crank-shaft F carries a heavy metal disk G, which in the particular construction shown forms the balance-wheel of the engine and also constitutes one part or member of a friction-gear, by which motion is communicated from the crank-shaft to the driving-wheels of the vehicle. This construction while desirable is not essential, however, inasmuch as a separate balance-wheel in addition to the disk G may be employed, if necessary, or in case it is preferred that the disk G should not be made of sufficient weight to perform the functions of a balance-wheel.

The driving connections by which motion is transmitted from the motor to the rear axle embrace two separate speed-changing devices, one being the friction-gear, of which the disk G forms a part or member, and the other a toothed or spur gear, both of said gears being controlled by means of hand or foot levers within reach of the operator. The friction-gear referred to is used in the ordinary running of the vehicle for the purpose of varying its speed within such limits as may be desirable for ordinary purposes, while the spur-gear is employed for giving a considerably reduced speed with a corresponding increase of power, as may be necessary for ascending a declivity or in hauling a heavy load or under other similar circumstances. The driving connections between the motor and the rear axle also include a device applied to the rear axle for equalizing the power transmitted to the two driving-wheels thereof, the compound construction of the rear axle above referred to being employed as part of such equalizing device.

The equalizing device referred to is made as follows: Attached to the part $b\ b'$ of the rear axle are two beveled gears H H′ of equal size, the gear H being attached to the sleeve $b$ and the gear H′ to the sleeve $b'$. The sleeve $b$ of the axle is shown as extending through or engaging both of the bearings D D on the vehicle-frame, so that the part of the sleeve $b'$ is located entirely at one side of the frame, and the meeting ends of the said sleeves with the gears H and H are located adjacent to and outside of one of the side frame-pieces A′. Mounted loosely on the axle between the gears H and H′ is another and larger gear-wheel I, the same being herein shown as engaging or having its bearing upon the adjacent end portions of both sleeves $b$ and $b'$. The gear-wheel I constitutes the medium through which rotary motion is transmitted from the driving-gear to the axle B, and said wheel is for this purpose arranged to intermesh with a gear-wheel J, mounted on a stationary stud or axle $j$, which is held in a bracket $j'$ on one of the side frame-pieces in advance of the rear axle. The said wheel J is driven from or, in fact, forms part of the speed-changing spur-gear for giving slow motion, hereinbefore referred to. The gear-wheel I carries one or more beveled gears K, which are arranged to turn or revolve about axes which are radial with reference to the axle and are adapted to engage or intermesh with the teeth of both beveled gears H and H′. The said beveled gears K may be mounted in any suitable way on the wheel I, but as herein shown are attached to short shafts $k'$, which have bearings at their ends in suitable bearing-boxes on the wheel I, as clearly seen in the drawings, Fig. 5.

In the operation of the gearing above described it is obvious that as long as both driving-wheels turn at an equal speed there will be no relative movement thereof or of the gears H and H′, and the beveled pinions K will merely turn with the wheel I and serve to connect said wheel I with the gears H H′ without rotating on their own axes. If, however, it becomes necessary that one of the driving-wheels should rotate faster than the other, as in altering the course of the vehicle or turning a corner, this will be permitted without interfering with the proper transmission of power to the driving-wheels, it being obvious that in such case the gears H and H′ will turn relatively to each other, thereby rotating the pinions K, while the wheel I continues to revolve at the uniform speed at which it is being driven. In this way application of power to the two driving-wheels is equalized—that is to say, practically the same driving force operates on both wheels when one is turning faster than the other as when both are turning at the same speed, so that in no case is the driving force liable to come mainly or entirely on one wheel.

To now refer to the friction speed-changing gear, hereinbefore mentioned, the same is constructed as follows: L is a shaft extending across the machine in front of the disk G and carrying a friction wheel or pulley L′, which runs against the face of the disk G and is mounted to slide endwise on the shaft L. Said pulley acts, in connection with the disk G, generally in the same manner as in other similar friction-gearing, giving more rapid movement to the shaft L when near the outer part or margin of the disk and a slower movement when shifted to a point nearer the center of the disk. The pulley L′ is held from rotation on the shaft L, while being free to move endwise thereon, by means of a spline $l$ on the shaft, and a lever device is employed for shifting the pulley, consisting of a hand-lever $L^2$, which is pivoted to a standard $l'$, attached to the vehicle-frame, and is connected at its lower end with a collar $l^2$ on the hub of the pulley $L'$ by means of links $l^3$ $l^3$.

No locking or holding device is provided for securing the pulley $L'$ from endwise movement on the shaft; but in place thereof the disk G is provided with a plurality of concentric grooves adapted for engagement with the rounded periphery of the pulley $L'$, and the shaft L is made movable toward and from the face of the disk G, so that it may be thrown outwardly to permit the pulley $L'$ to be shifted on the shaft L in position to engage any one of the grooves, as desired, and then moved toward the disk to secure frictional engagement between the pulley and the disk. The grooves in the disk G are clearly indicated in Fig. 3. The grooves thus arranged not only serve to hold the pulley in place, but also afford much better and more effective frictional or holding engagement of the pulley with the face of the disk.

In order to take from the crank-shaft lateral pressure or strain which would arise from the pressure of the pulley $L'$ against the face of the disk G, I have provided backing or supporting rollers $G'$ $G'$, which have their pivotal axes in the same horizontal plane as the crank-shaft and are arranged in contact with the rear face of said disk G, so as to run smoothly thereon during the rotation of the disk and at the same time to prevent backward yielding or deflection of the disk under pressure of the said pulley $L'$. Said rollers $G'$ $G'$ are shown as supported on hangers $G^2$, which are attached to the forward cross-piece $A^2$ of the two cross-pieces at the rear end of the machine-frame.

Provision is made for the movement of the pulley $L'$ on the shaft L past the center of the said disk G, so that said pulley may be shifted to bring it to a point at either side of the center of the disk as well as at any desired distance from the center thereof. This construction provides for reversing the direction or motion of the vehicle at will and without requiring any manipulation on the part of the operator except to throw the lever $L^2$ the required distance for properly shifting the pulley.

I have shown the shaft L as movable at one end only and as having its opposite end connected by a flexible joint with a short shaft M, which is connected by suitable gearing with the driving-wheels of the vehicle and forms in effect a part or extension of the shaft L. The flexible connection between the shafts L and M is herein shown conveniently consisting of a universal or gimbal joint $M'$. The movable or free end of the shaft L is mounted in a movable bearing N, which is acted upon by a spring in such manner that the pulley $L'$ is normally held free from the face of the disk G and is connected with an actuating-lever under control of the operator in such manner that the latter may at will force or throw the said pulley against the said disk.

In the particular construction illustrated the parts above referred to are made as follows: The bearing N is attached to or supported by a depending arm or hanger $N'$, which is secured to a rock-shaft $n$, mounted in a bearing $n'$, attached to the side frame-piece $A'$. Attached to the rock-shaft $n$ is an arm $N^2$, to the outer end of which is attached a cross piece or rod $N^4$, which at the opposite side of the frame is secured to the free end of a corresponding arm $N^3$, which is pivoted to the frame in such manner as to swing about an axis concentric with that of the arm $N^2$. Springs O O, secured to the wagon-body and acting upon the rod $N^4$, serve to swing upwardly the free end of the arm $N^2$ and to thereby move the bearing N in a direction to carry the pulley $N'$ away from the disk G. Pressure applied to said rod $N^4$ against the action of the spring, as by the foot of the operator, will carry said bearing N and pulley in the opposite direction or toward the disk, so that by pressing downwardly upon the bar $N^4$ the pulley may be easily brought against the face of the disk. Means is thus provided by which the vehicle may be easily and quickly stopped and started without disturbing the regular running of the engine or motor, it being obvious that motion will be transmitted from the disk G to the shaft L only when the rod $N^4$ is pressed downwardly and that the vehicle will continue in movement only so long as pressure is thus maintained on the bar. It will also be obvious that by releasing said bar from pressure the pulley $L'$ will be separated from the disk, and the driving power will then no longer be transmitted to the wheels, and the vehicle will come to a stop.

Figure 9:
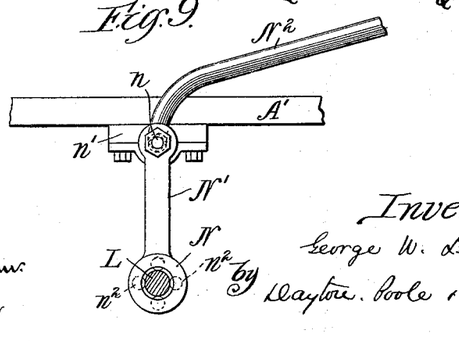
Fig. 9 is a detail section taken on line 9 9 of Fig. 2, showing the hanger which supports one end of the friction-wheel shaft.

In order to lessen the friction due to the turning of the shaft L in the bearing N, said bearing is made in the form of an antifriction roller or ball bearing, the same being provided with an interior annular groove or recess containing a plurality of antifriction-balls $n^2$ $n^2$, as clearly seen in the drawings, Fig. 9.

It is obvious that when the shaft L is shifted away from the friction-disk and the pulley $L'$ is free from the same said pulley is liable, by reason of the unequal balance of the lever $L^2$ or by the jarring of the vehicle, to be moved endwise on the shaft in a manner to carry it out of the position in which it had been placed. To avoid possibility of such shifting of said pulley, I propose to employ suitable holding devices arranged to which may be either positively acting or of frictional character. A device for this purpose (shown in the drawings) is made as follows: The lever $L^2$ passes through a slot in the bottom $a$ of the vehicle-body, and at one side of said slot is placed a plate or bar $l^4$, with shallow notches or depressions adapted for engagement with a spring-actuated detent carried by the lever and consisting in the particular construction shown of a flat metal spring $l^5$, attached to the side of the lever. The notched or serrated edge of the bar $l^4$ is so shaped that the spring may easily pass from one depression to another as the lever is swung, and the depressions correspond with the grooves in the face of the disk G, so that when the pulley is opposite either groove the engagement of the spring with one of the depressions will hold the parts from movement unless sufficient force is applied to the lever to carry the spring-arm out of one depression into another one. The bar $l^4$ is shown as provided with four notches only, it being practically unnecessary to carry the driving-pulley farther past the center of the friction-pulley G in reversing than sufficient to bring it into engagement with the third or innermost groove, because it will not commonly be desired to run the vehicle backward faster than the slowest speed provided for by the friction-gear.

In order to enable the bar $N^4$ to be locked or held in its depressed position in cases where it is desired that the vehicle should continue running at a uniform rate of speed for a long time, I have provided a locking or holding device, which is more clearly seen in Figs. 2, 10, and 11 and which is constructed as follows: P is an auxiliary foot-lever pivoted to the wagon-body at a point forward of the cross-bar $N^4$ and extending rearwardly over the same. Said auxiliary foot-lever is provided with a flat or leaf spring P', which is secured thereto with its free end in position to bear upon the cross-bar $N^4$, so that when said foot-lever P is pressed downwardly pressure will be transmitted to the said bar $N^4$ through the medium of said spring. A pivoted detent $P^2$ is arranged at the side of the bar P in such position as to engage the same when it is pressed downwardly, said detent preferably being provided with a series of notches $p\ p$, either of which may be engaged by the lever P, according to the distance to which the same is forced downwardly. The detent $P^2$ is shown as pivotally connected at its lower end with the floor of the vehicle-body and as provided with a leaf-spring $p'$, which acts to throw forward or toward the lever P the said detent. Said spring is shown as secured to an upright $P^3$, which is located at the rear of the said detent. By employing a holding device embracing a spring, as P', operating as described, the pulley L' is pressed against the disk G with a yielding pressure, while at the same time provision is made for a slight movement or yielding of the bearing N and the free end of the shaft L, made necessary by reason of the lateral shifting or change of position of the opposite end of said shaft L, which occurs when the positively-acting speed-changing gear hereinbefore referred to is brought into use.

To now refer to the construction of the positively-acting speed-changing gear referred to, Q Q' indicate two bearing-plates, which are connected by studs $q\ q$ and which are pivotally connected with the bracket $j$ by means of a pivot-stud $q'$. Attached to the outer bearing-plate Q is a hand-lever $Q^2$, which extends upwardly at the side of the vehicle-body and by which the frame formed by the side plates Q Q' may be swung or oscillated on the pivot-bolt $q'$. The upper end of said lever $Q^2$ is provided with a spring-catch $q^2$, adapted for engagement with a notched bar $q^3$ on the side of the vehicle frame or body, whereby said lever may be locked or held at either limit of its movement.

Figures 1, 10, 11:
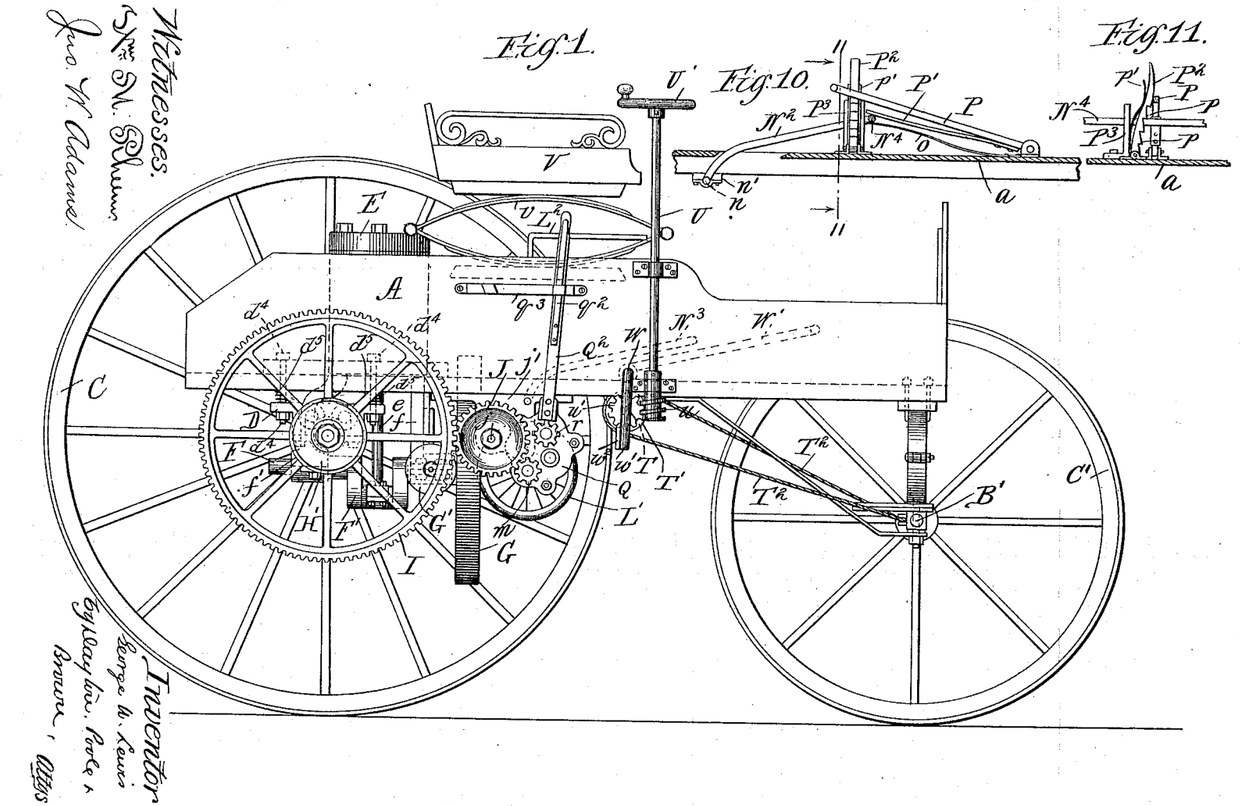
Figure 1 is a view in side elevation of a vehicle embodying my invention, the supporting-wheels thereof nearest the eye being removed to show more clearly the operative parts.
Fig. 10 is a detail side elevation of the foot-lever and connections by which the friction-gearing is operated.
Fig. 11 is a section of the same, taken on line 11 11 of Fig. 10.

The shaft M, hereinbefore referred to, extends through and has bearings in the plates Q and Q', and said shaft is provided at its outer end with a gear-pinion $m$, adapted for engagement with the gear-wheel J, as clearly seen in Fig. 1. Mounted in the side plates Q and Q', above and parallel with the shaft M, is a second shaft R, which carries at its outer end a gear-pinion $r$, which is also adapted to engage the said wheel J. The shafts M and R are so located in the plates Q and Q' that by swinging said plates about the pivot-pin $q'$ either one of the pinions $m$ or $r$ may be brought into mesh with the wheel J, as desired. Mounted in said plates Q and Q' is a third shaft S. This shaft is provided with a gear-wheel S', which intermeshes with a gear-pinion $m'$ on the shaft M. Said shaft S is also provided with a gear-pinion $s$, which intermeshes with a gear-wheel R' on the shaft R. The gear wheels and pinions $s, s', m'$ and R' are preferably located between the plates Q and Q', as shown. Said several gear wheels and pinions constitute an intermediate gear, by which motion is transmitted from the shaft M to the shaft R, it being obvious that inasmuch as the pinion $m'$ is much smaller than the gear S' and the pinion $s$ is much smaller than the gear R' the shaft R will be driven at a much less speed, but with much greater power than the shaft M. The said gearing, which is carried by the plates Q and Q', revolves continuously during the running of the vehicle, and either one or the other of the pinions $r$ or $m$ is engaged with the wheel J, according to the speed at which it is desired to run the vehicle. In case an ordinary speed of from four to ten miles an hour is required the lowermost pinion $r$ is thrown into engagement with the wheel J, and minor variations in speed required in running are then taken care of by the friction driving devices hereinbefore described. In case, however, it is desired to run the vehicle very slowly, but with much power, as in climbing hills, the hand-lever $Q^2$ is manipulated to bring the upper pinion $r$ into mesh with the wheel J while releasing the lower pinion therefrom, so that motion will be transmitted to the wheel J through the medium of the several gear-wheels described and much more slowly, but with more power than when the pinion $m$ is in use.

As hereinbefore stated, the disk G, which constitutes part of the friction speed-changing device, has a plurality of grooves in its face, in either of which grooves the pulley L' may operate, and inasmuch as the positively-acting or spur-gear speed-changing device is capable of giving two different degrees of speed it follows that the machine may be driven at different degrees of speed equal in number to twice the number of grooves in the disk G. As shown in the drawings, said disk is provided with three grooves, and it follows that by the gearing illustrated six different speeds may be attained—that is to say, when the pinion $m$ is in mesh with the wheel J, so that motion is transmitted directly from the shaft L to said wheel, thereby giving a speed proper for ordinary road use, the pulley L' may be shifted to either of the three grooves $g$, thereby giving a considerable variation in speed, and when the lever $Q^2$ is actuated to bring the pulley $r$ into mesh with the wheel J, giving a very low speed, the pulley L' may be similarly shifted to vary the speed of the vehicle. It will of course be understood that in either case the vehicle may be driven backward at a variable speed by shifting the pulley L' to the opposite side of the driving-shaft from that in which it is shown in the drawings.

The devices shown for turning the front axle B' for the purpose of steering the vehicle are made as follows: T is a transversely-arranged shaft mounted in bearings on the side frame-pieces A' and provided inside of said frame-pieces with two spools or winding-drums T' T'. Secured to the front of the axle near its outer ends are ropes or chains $T^2 T^2$, which are attached to and adapted to be wound upon the drums T' T'. The said ropes are wound in opposite directions on the two drums, so that when the shaft T is rotated one rope will be wound upon its drum and the other unwound from its drum, so that by turning the said shaft in one direction or the other the front axle will be swung or turned as necessary for guiding the vehicle to the right or left. In order that one of the drums T' may be adjusted on the shaft T for taking up slack in the ropes $T^2 T^2$, I provide the same with a tubular extension or hub $t$, in which is placed a set-screw $t'$, by which the drum is clamped upon the shaft. For actuating the shaft T an upright shaft U is mounted on the side of the vehicle-body and is connected at its lower end with the shaft T by a worm-gear, consisting of a worm $u$ on the shaft U, engaging a gear-wheel $u'$, which is secured to the shaft T outside of the frame-piece on which it is mounted. The said upright shaft U is provided at its upper end with a hand-wheel U', located in position within convenient reach of the person operating the vehicle.

The vehicle shown in the accompanying drawings is provided with a seat V for the driver, said seat being located over the central portion of the body and supported upon springs $v\,v$ in the manner shown. The several controlling-levers above referred to are located in position convenient for the operator sitting on said seat, the hand-lever $Q^2$ and hand-wheel U' being located at the side of said seat convenient for the right hand of the operator, the cross-bar $N^4$ and the foot-lever P being located in convenient position to be reached by the foot of the operator when sitting on the seat, and the speed-changing and reversing lever $L^2$ being located beneath the seat, but in position to be easily reached by the operator, said lever having a forwardly-bent horizontal portion which reaches nearly to the front edge of the seat in the manner shown.

The vehicle illustrated is provided with a brake for the rear or driving wheels, consisting of a horizontal shaft W, which is mounted in bearings $w\,w$ on the main side frame-pieces A' and is provided at it ends with depending arms $w'$, having on their lower ends brake-shoes $w^2$ for contact with the wheels. A foot-lever W' is attached to the said shaft W and extends forwardly from the same above the vehicle floor or botton in position convenient for the foot of the operator when the latter is sitting on the seat V.

Figure 6:
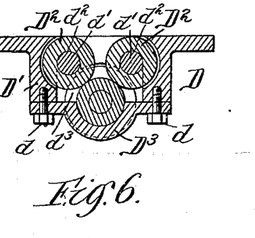
Fig. 6 is a cross-section of the axle-bearing, taken on line 6 6 of Fig. 5.
Figure 7:
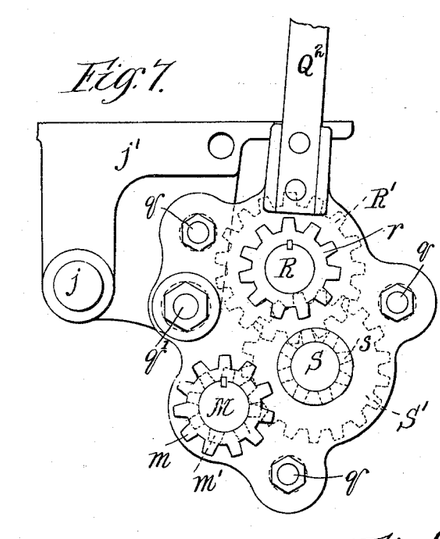
Fig. 7 is an enlarged detail view, in side elevation, of the change speed-gearing.
Figure 8:
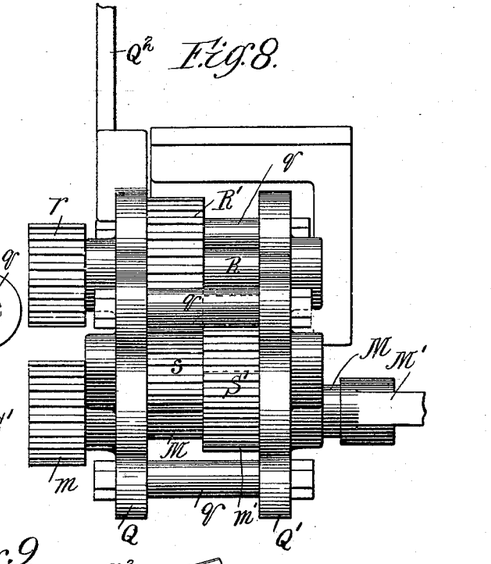
Fig. 8 is a front elevation of the same.

The bearings D of the rear axle are constructed as follows: Each of said bearings, as more clearly seen in Fig. 6, consists of a body or shell D', carrying in its upper part two antifriction-rollers $D^2 D^2$ and having attached to its lower end a cap $D^3$, which serves to hold the axle in place within the bearing, said cap being secured to the main part or body of the bearing by bolts $d\,d$ in the usual manner. The antifriction-rollers $D^2 D^2$ are mounted on short shafts $d'\,d'$, which rest in semicircular seats or sockets $d^2 d^2$, formed in the side walls of the shell or casting A', as clearly seen in dotted line in Fig. 6. The seats or sockets $d^2 d^2$ are open at their lower parts, so that when the cap $D^3$ is removed and the axle taken from its place the rollers $D^2$ and their shafts $d'$ will drop from their places in the bearing. The said shaft is provided at either side of the cap $D^3$ and rollers $D^2$ with flanges or collars $d^3$, which are clearly seen in Fig. 5, the said cap being made no wider than said rollers, so that the flanges bear equally on the side surfaces of the cap and rollers.

The construction described in these parts affords bearings for the axles of simple form, which may be easily constructed, are efficient in operation, and may be easily taken apart for repairs.

In order to afford an elastic support for the rear part of the vehicle and the motor, which is located therein, the bearings D, instead of being rigidly attached to the vehicle-frame, are supported by means of bolts $d^4$, which pass through lateral flanges of the bearings and have sliding engagement therewith, and springs $d^5 d^5$, of coiled form, are inserted between the upper faces of the bearings and the lower surface of the machine-frame, said springs being placed around the bolts $d^4$ and held in place thereby.

An important advantage is gained by the use, in connection with the vehicle driving-wheels and a motor or prime mover, of driving-gear embracing a friction speed-changing and reversing mechanism so constructed as to permit the disconnection of the motor from the driving-wheels when desired, together with a spur-gear speed-changing mechanism interposed between the friction speed-changing and reversing mechanism and said driving-wheels, for the reason that the spur-gear speed-changing mechanism affords a means of transmitting motion to the driving-wheels of a character to turn the same slowly, but with great power when desired, while at the same time the location of such spur-gear speed-changing mechanism at the point indicated enables the same to be easily shifted or manipulated at any time without stopping the motor, because the motor may be disconnected from the remaining parts of the gearing by actuation of the friction speed-changing devices, and after this is done the spur-gear speed-changing device can then be operated as desired, it being obviously impracticable to shift such a spur-gear speed-changing device during the time driving power is being transmitted therethrough. It is not, however, necessary that the motion of the vehicle itself should be stopped in order to enable the moving part of the spur-gear speed-changing device to be moved or shifted, because I have found that as soon as the motor has been disconnected from the spur-gearing by operation of the friction devices the moving part of the spur-gear speed-changing device may be shifted to disconnect it from one gear-wheel and connect it with the other one, even though the driving wheels and gearing connected therewith continue to revolve by reason of the forward movement or the vehicle. In other words, the spur-gear speed-changing device can be easily manipulated when the parts thereof are in motion, provided that no power is being transmitted through them from the motor to the driving-wheels. By reason of the advantages obtained by this construction and relative location of the friction speed-changing and reversing mechanism and the spur-gear speed-changing mechanism these parts are herein claimed as part of my invention.

I claim as my invention—

1. The combination with vehicle driving-wheels and a prime mover of a speed-changing, reversing and power-disconnecting mechanism comprising a friction-disk, a shaft extending across the face of the disk, said shaft consisting of two parts or sections connected by a universal or flexible joint and one of which sections is mounted in fixed bearings on the machine-frame, gearing connecting said last-named section of the shaft with the vehicle driving-wheel, a pulley mounted on the movable section of the shaft and movable endwise thereon from one side of the disk to the other across the face of the disk, a movable bearing for the free end of the movable section of the shaft, means for giving movement to the said bearing and an actuating device connected with said pulley for moving it endwise on the shaft.

2. The combination with vehicle driving-wheels and a prime mover of a speed-changing, reversing and power-disconnecting mechanism comprising a friction-disk, a shaft extending across the face of the disk, said shaft consisting of two parts or sections connected by a universal or flexible joint and one of which sections is mounted in fixed bearings on the machine-frame, gearing connecting said last-mentioned section of the shaft with the driving-wheels, a pulley mounted on the movable section of the shaft and movable endwise thereon from one side of the disk to the other across the face of the disk, a movable bearing for the free end of the movable section of the shaft, an oscillating arm supporting said bearing, means connected with said arm for actuating the bearing comprising a foot-lever having rigid attachment to said arm and an actuating device connected with said pulley for moving it endwise on the shaft, substantially as described.

3. The combination with vehicle driving-wheels and a prime mover of driving-gear comprising a friction-disk and a pulley adapted for contact with said disk, a movable shaft with which the pulley has longitudinally-sliding but non-rotative connection, a movable bearing for said shaft, a spring applied to throw the shaft away from the friction-disk, an actuating-lever for forcing the shaft toward the disk and a locking device acting on said lever with spring-pressure, substantially as described.

4. The combination, with vehicle driving-wheels and a prime mover, of a driving-gear comprising a friction speed-changing, reversing, and power-disconnecting mechanism, and a spur-gear speed-changing mechanism interposed between the said friction speed-changing, reversing, and disconnecting mechanism, and the vehicle driving-wheels, substantially as described.

5. The combination with vehicle driving-wheels and a prime mover, of driving connections, comprising a friction-disk, a pulley adapted for contact with the face of the disk, which pulley is movable to either side of the center of the same, and a spur-gear speed-changing mechanism consisting of an oscillating frame carrying two pinions, gearing driving the same at different speeds, and a single gear-wheel adapted to be engaged by either pinion, substantially as described.

6. The combination with vehicle driving-wheels and a prime mover, of driving connections comprising a friction-disk, a pulley adapted for contact with the face of the disk, which pulley is movable to either side of the center of the disk and is also movable toward and from the face of the disk, and a spur-gear speed-changing mechanism consisting of an oscillating frame carrying two pinions, gearing driving the same at different speeds, and a single gear-wheel adapted to be engaged by either pinion, substantially as described.

7. The combination with vehicle driving-wheels and a prime mover, of a driving-gear, comprising a stationary gear-wheel through which motion is transmitted to the driving-wheels, an oscillating frame, two pinions mounted on the frame either of which may be engaged with the said gear-wheel by oscillation of the frame, and gearing on the frame by which one of said pinions is driven faster than the other, substantially as described.

8. A driving-gear comprising an oscillating frame, a driving-shaft mounted on said frame, a pinion attached to said shaft, a shaft carrying a second pinion, a stationary gear-wheel with which either of said pinions may be engaged by oscillation of the frame, an intermediate shaft mounted on the frame, and gear wheels and pinions attached to said shafts whereby motion is transmitted from the driving-shaft through the medium of the intermediate shaft to the shaft which carries the second pinion, substantially as described.

9. The combination with vehicle driving-wheels and a prime mover of a driving-gear comprising a friction-disk, a pulley adapted for contact with the face of the disk, a shaft supporting said pulley with which said pulley has longitudinal sliding but non-rotative connection, said shaft consisting of two parts connected by a flexible joint, a movable bearing engaging the part of the shaft on which the pulley is mounted, an oscillating frame in which the other part of said shaft is mounted, gear-pinions on said frame which are driven from said shaft by gearing giving greater speed to one pinion than to the other and a gearing-wheel with which either of said pinions may be engaged by oscillation of said frame, substantially as described.

10. The combination with vehicle driving-wheels and a prime mover, of driving connections comprising a friction-disk, a pulley adapted for contact therewith, a shaft with which the pulley has longitudinally-sliding but non-rotative connection, said shaft consisting of two parts united by a universal joint on one of which parts the pulley is mounted, a movable bearing for the part of the shaft on which the pulley is mounted, an oscillating frame supporting the other part of said shaft, a pinion on the part of said shaft carried by said oscillating frame, a second pinion mounted on said frame, gearing on the frame by which the said second pinion is driven and a gear-wheel with which either of said pinions may be intermeshed by the rocking of the oscillating frame, substantially as described.

11. The combination with vehicle driving-wheels and a prime mover of a driving-gear comprising a stationary gear-wheel, an oscillating frame, two pinions mounted on the frame either of which may be engaged with the gear-wheel, gearing on the frame by which one of said pinions is driven faster than the other and an actuating-lever attached to the said frame and provided with a locking device for holding the frame in a desired position, substantially as described.

12. The combination with vehicle-wheels and a prime mover, of driving connections comprising an oscillating frame, two pinions mounted on the frame, gearing driving said pinions at different speeds, a gear-wheel with which either of said pinions may be engaged by oscillation of the frame, a friction-disk, a pulley adapted for contact with the face of the disk, a shaft with which said pulley has longitudinally-sliding but non-rotative connection, said shaft consisting of two parts united by a flexible joint one of which parts is mounted in said oscillating frame, a movable bearing for the part of said shaft which carries said pulley, an actuating-lever connected with said bearing for moving the same, a spring applied to throw the pulley away from the disk and a locking device for engaging the actuating-lever to hold the pulley in contact with the disk, said locking device embracing a spring by which the actuating-lever is held with yielding pressure, substantially as described.

13. The combination with vehicle driving-wheels of a prime mover, the crank-shaft of which is arranged at right angles with the axis of rotation of the driving-wheels, a friction-disk mounted on said shaft, a friction-pulley adapted for contact with the face of the disk, a shaft with which said pulley has longitudinally-sliding but non-rotative connection, said shaft being arranged parallel with the axis of rotation of the driving-wheels and movable toward and from the face of the disk, a spur-gear speed-changing device embracing an oscillating frame adapted to rotate or swing on a horizontal axis parallel with the axis of rotation of the driving-wheels, gearing connecting said speed-changing device with the driving-wheels, substantially as described.

14. The combination with vehicle driving-wheels and a prime mover, the crank-shaft of which is arranged at right angles with the axis of the driving-wheels, of a friction-disk attached to said shaft, a pulley adapted for contact with the face of the friction-disk, a horizontal shaft with which said pulley has sliding but non-rotative engagement, said shaft being movable toward and from the disk, an actuating-lever for moving the pulley endwise on the shaft, an actuating-lever for moving the shaft toward and from the disk, an oscillating frame carrying two pinions, gearing on the frame actuated by said shaft and driving said pinions at different speeds, a gear-wheel with which either of said pinions may be engaged by oscillation of said frame, an actuating-lever attached to the frame for moving the said frame, and a gear-wheel on the driving-wheel axle intermeshing with said gear-wheel last mentioned, substantially as described.

15. The combination with vehicle driving-wheels, a frame and a prime mover, of a revolving axle through which motion is transmitted to the driving-wheel, and bearings for said axle comprising a shell or casing attached to the vehicle-frame, antifriction-rollers mounted in said shell and engaging the upper surface of the axle-bearing, pins for the rollers resting in sockets in the frame, a cap holding the axle in place in the bearing, and flanges or collars on the axle bearing against the side faces of the rollers and the cap, substantially as described.

16. The combination with vehicle driving-wheels, a frame and a prime mover, of an axle through which motion is transmitted to the driving-wheels, bearings for the axles located beneath the frame, bolts for connecting the said bearings with the frame, said bolts being arranged vertically and passing loosely through the said bearings, and coiled springs interposed between the bearing-boxes and the frame, substantially as described.

17. The combination with a vehicle-body, driving-wheels at the rear of the body and a motor for actuating driving-wheels, supporting-wheels in front of the body, an axle for the same pivotally connected with the body, and a steering-gear comprising a transverse shaft provided with two drums, ropes connecting the axle with the drums, and means for turning said shaft on which the drums are mounted, one of said drums being adjustably connected with the shaft whereby the ropes may be tightened, substantially as described.

In testimony that I claim the foregoing as my invention I affix my signature in presence of two witnesses.

GEORGE W. LEWIS.

Witnesses:
C. CLARENCE POOLE,
TAYLOR E. BROWN.